United States Patent Office 3,560,463
Patented Feb. 2, 1971

3,560,463
COPOLYMERS OF ETHYLENE WITH CETYL VINYL ETHER OR n-OCTADECYL VINYL ETHER
Samuel E. Colburn, Atwood, and Duane K. Bryant, Charleston, Ill., assignors to National Distillers and Chemical Corporation, New York, N.Y., a corporation of Virginia
No Drawing. Filed June 26, 1968, Ser. No. 740,031
Int. Cl. C08f 15/02
U.S. Cl. 260—88.1         3 Claims

ABSTRACT OF THE DISCLOSURE

There are provided novel copolymers of ethylene with certain alkyl vinyl ethers which contain between about 5 to about 10% by weight of copolymer of the alkyl vinyl ether moiety. These novel copolymers provide materials having superior slip properties in relation to previously known copolymers of ethylene.

FIELD OF THE INVENTION

Copolymers of ethylene with alkyl vinyl ethers produce film having improved slip properties.

DESCRIPTION OF THE PRIOR ART

Copolymers of ethylene with alkyl vinyl ethers have been prepared. In Glusenkamp U.S. Pat. No. 3,026,290, the alkyl vinyl ether comonomer is hexadecylvinylether. The copolymers produced in accordance with this invention are disclosed as being useful as surface-coating films, laminates, plasticizers, etc., but in particular as adhesives and tackifiers; that is to say these copolymers exhibit properties directed to uses in direct contrast to those foreseen in the present invention.

Nowlin, in U.S. Pat. No. 3,023,198 discloses copolymers of ethylene and of vinyl ethers which, however, do not contain more than 15 carbon atoms in the vinyl ether monomer moiety. Moreover, these copolymers are disclosed as being useful in solvent and water-dispersed waxes, a use in no way foreshadowing the films having superior slip properties of the present invention. Also of interest would be considered U.S. Pat. No. 3,033,840 to Strauss which discloses copolymers of ethylene with vinyl alkyl ethers, in particular methylvinyl ethers, which are useful in the formation of glossy films. Copolymers of ethylene with lower alkyl vinyl ethers wherein the alkyl group is between two and ten, preferably between two and six, are disclosed in U.S. Pat. No. 3,226,374 to White et al. This patent, however, does not disclose alkyl vinyl ethers wherein the alkyl group is of the chain length contemplated in the present invention. Furthermore, the compounds produced in accordance with this last patent are disclosed as having extrusion characteristics superior to that found in homopolymers of ethylene and make no reference to materials having superior slip characteristics.

SUMMARY OF THE INVENTION

This invention relates to the novel copolymers of ethylene with certain alkyl vinyl ethers which have desirable slip characteristics. The alkyl vinyl ethers which have been found particularly suitable for the formation of the novel copolymers of the present invention are cetyl vinyl ether and n-octadecyl vinyl ether.

The novel polymers are prepared by polymerizing ethylene in the presence of a solution of the alkyl vinyl ether. Any solvent commonly used in the process of solution polymerization under pressure may be employed. The polymerization reaction is initiated by free radical catalysts and is run at temperatures of between 250° F. and 600° F., at pressures of from about 15,000 p.s.i. to about 40,000 p.s.i.

These novel copolymers have a melt index of between 4 and 11 and a coefficient of friction of between 0.15 and 0.4.

PREFERRED EMBODIMENTS

In the preferred embodiment of the present invention, the polymerization reaction for the preparation of the novel copolymers of the present invention is carried out in a solvent such as alcohol, acetone, ethyl ether, benzene, heptane, methanol, carbon tetrachloride, and the like, most suitably in benezene. It is preferred that this reaction take place at pressures between 20,000 and 30,000 p.s.i. at a temperature of between 300° and 460° F.

Among the catalysts which may be utilized in the process of the present invention air, oxygen, and peroxidic compounds are useful. For example, peroxidic compounds such as hydrogen peroxide, t-butyl hydroperoxide, persuccinic acid, lauryl peroxide, buteryl peroxide, acetyl peroxide, benzoyl peroxide, peracetic acid, dipropionyl peroxide, ditert-butyl peroxide, diisopropyl peroxydicarbonate, t-butyl perpivalate, alkali metal persulfates, perborates and percarbonates, and the like, may be employed. Preferred among those, however, are diisopropyl peroxidicarbonate and t-butyl perpivalate.

The concentration of the catalyst may be varied from about 0.001 to about 5% based on the total weight of polymerizable monomers charged. The preferred concentration is from about 0.003 to about 1% by weight. The catalyst is dissolved in a hydrocarbon solvent suitably a polybutene such as Certrex 39® (a product of the Mobil Oil Co., New York, N.Y.).

In the preferred modification, a solution of comonomer in benzene is prepared. The solution contains between 5 and 50% of comonomer, preferably about 20% of comonomer by weight. The reactor is charged with ethylene to the desired pressure and catalyst solution together with monomer solution is fed into the reactor together with ethylene. It is preferred to feed the comonomer at a rate of between 5 to 20, preferably about 10 pounds per hour of solution and the ethylene at a rate of 50–200, preferably 75 to 100 pounds per hour. The preferred feed ratios of ethylene: comonomer lying in the range of 25:1–120:1, preferably 75:1 to 110:1. After passing through the reactor which is maintained at a temperature within the preferred range, the hot liquid copolymer and unreacted monomers are discharged through a suitable control valve and fed into a vessel where the copolymer was separated and unreacted monomers vented.

The slip properties of the certain copolymers prepared in accordance with the specific examples of this invention were compared with those obtained from copolymers of vinyl acetate and ethylene. The results of these tests are summarized in the following table.

TABLE OF COMPARISON OF SLIP PROPERTIES

| | Run Number | | | | | | | |
|---|---|---|---|---|---|---|---|---|
| | Ex. 1 | Ex. 2 | Ex. 3 | Ex. 4 | Ex. 5 | A | B | C |
| MI | 8.4 | 10.7 | 9.1 | 4.94 | 6.49 | 2.13 | 3.7 | 7.92 |
| Monomer | [1] OVE | [1] OVE | [1] OVE | [1] OVE | [2] OVE | Vinyl acetate | | |
| Percent monomer | 9.6 | 9.8 | 6.0 | 4.53 | ([3]) | 5.0 | 6.8 | 15.6 |
| Coefficient of friction | 0.19 | 0.31 | 0.31 | 0.40 | 0.38 | >1.0 | >1.0 | >1.0 |

[1] Octadecyl vinyl ether.
[2] Cetyl vinyl ether.
[3] Not determined.

EXAMPLE 1

Ethylene is fed to a high pressure reactor at a pressure of 20,000 p.s.i. at a feed temperature of 104° F. An initiator consisting of a 0.375% soluiton of t-butyl perpivalate in Certrex 39 is injected at a rate of 5.46 lb./hr. of catalyst solution. Octadecyl vinyl ether comonomer in benzene is added as a 50% solution at a rate of 5.32 lb./hr. of comonomer solution. The ethylene feed rate is 83 lb./hr. The mixture is passed continuously through a jacketed one-liter volume, stirred reactor which is maintained at a temperature of 382° F. After passing through the reactor, the hot liquid copolymer and unreacted comonomers are discharged through a suitable control valve, and fed into a vessel where the copolymer is separated and the unreacted monomer and ethylene are vented to atmosphere. The polymer produced has a melt index of 8.4 and a coefficient of friction of 0.19.

EXAMPLE 2

The polymerization procedure of Example 1 is repeated except that ethylene is fed at the rate of 90 lb./hr. at a feed temperature of 73° F., the catalyst is a 0.25% solution of t-butyl perbenzoate which is fed at the rate of 1.57 lb./hr. of catalyst solution. The comonomer is fed at the rate of 3.76 lb./hr. and the reaction run at 455° F. The copolymer produced has a melt index of 10.7 and a coefficient of friction of 0.31.

EXAMPLE 3

The polymerization procedure of Example 2 is repeated except that ethylene is fed at the rate of 105 lb./hr. at an initial feed temperature of 109° F. The catalyst is a 0.5% solution of diisopropylperoxydicarbonate in Certrex 39 which is fed at the rate of 3.4 lb./hr. of catalyst solution. The comonomer is a 10% solution of comonomer in benzene which is fed at a rate of 10 lb./hr. of solution. The reaction is carried out at a temperature of 323° F. The polymer produced has a melt index of 9.1 and a coefficient of friction of 0.31.

EXAMPLE 4

The polymerization procedure of Example 2 is repeated except that ethylene is fed at a rate of 95 lb./hr. at an average feed temperature of 123° F. The catalyst used is a 1% solution of t-butyl perpivalate in Certrex 39 and is fed at a rate of 0.72 lb./hr. of catalyst solution. The comonomer solution contains 20% by weight of the comonomer and is fed at a rate of 4.38 lb./hr. The reaction is carried out at a temperature of 388° F. The polymer produced has a melt index of 4.9 and a coefficient of friction of 0.40.

EXAMPLE 5

The polymerization procedure of Example 2 is repeated except that ethylene is charged at a rate of 105 lb./hr. at an initial feed temperature of 113° F. to an operating pressure of 20,250 p.s.i. T-butyl perpivalate is charged as a 0.5% solution in Certrex 39 at a rate of 2 lb./hr. of catalyst solution. In place of octadecyl vinyl ether, cetyl vinyl ether is used and charged as a 20% solution in benzene at a rate of 5 lb./hr. of solution. The reaction is run at a temperature of 385° F. The polymer produced has a melt index of 6.5 and a coefficient of friction of 0.38.

Although this invention has been described with respect to particular embodiments, it should be understood that many variations and modifications will now be obvious to those skilled in the art, and, therefore, the scope of this invention is limited not by the specific disclosure herein but only by the appended claims.

What is claimed is:
1. A normally solid copolymer of ethylene and an alkyl vinyl ether selected from the group consisting of cetyl vinyl ether and n-octadecyl vinyl ether containing a proportion of between 5 and 10% by weight of the vinyl alkyl ether copolymerized therewith, having a melt index of between 4 and 11, and a coefficient of friction of between 0.15 and 0.4.
2. A copolymer of claim 1 wherein the alkyl vinyl ether moiety is n-octadecyl vinyl ether.
3. A copolymer of claim 1 wherein the alkyl vinyl ether moiety is cetyl vinyl ether.

References Cited

UNITED STATES PATENTS

| 3,023,198 | 2/1962 | Nowlin et al. | 260—88.1 |
| 3,026,290 | 3/1962 | Gluesenkamp | 260—45.5 |
| 3,033,840 | 5/1962 | Strauss | 260—88.1 |
| 3,226,374 | 12/1965 | White et al. | 260—88.1 |

FOREIGN PATENTS

| 486,097 | 8/1952 | Canada | 260—88.1 |

JAMES A. SEIDLECK, Primary Examiner

S. M. LEVIN, Assistant Examiner

U.S. Cl. X.R.

260—87.3